(12) United States Patent
Bunsmann et al.

(10) Patent No.: US 7,497,510 B2
(45) Date of Patent: Mar. 3, 2009

(54) MOTOR VEHICLE BODY OR SUPPORTING FRAME COMPRISING A VIBRATION DAMPING DEVICE

(75) Inventors: Winfried Bunsmann, Bissendorf (DE); Peter Kalinke, Osnabrück (DE)

(73) Assignee: Wilhelm Karmann GmbH, Osnäbruck (DE)

( * ) Notice: Subject to any disclaimer, the term of this patent is extended or adjusted under 35 U.S.C. 154(b) by 0 days.

(21) Appl. No.: 10/575,281

(22) PCT Filed: Sep. 18, 2004

(86) PCT No.: PCT/DE2004/002095

§ 371 (c)(1),
(2), (4) Date: Dec. 8, 2006

(87) PCT Pub. No.: WO2005/035335

PCT Pub. Date: Apr. 21, 2005

(65) Prior Publication Data

US 2007/0205635 A1    Sep. 6, 2007

(30) Foreign Application Priority Data

Oct. 11, 2003 (DE) ................................ 103 47 366

(51) Int. Cl.
*B62D 25/20* (2006.01)
(52) U.S. Cl. .................................................. 296/204
(58) Field of Classification Search ............ 296/193.07, 296/30, 204, 187.08; 280/781, 124.152; 180/311

See application file for complete search history.

(56) References Cited

U.S. PATENT DOCUMENTS 6,206,460 B1 * 3/2001 Seeliger et al. ............. 296/204

FOREIGN PATENT DOCUMENTS

DE    198 20 617    11/1999
EP    1 225 119     7/2002

* cited by examiner

*Primary Examiner*—Joseph D Pape
(74) *Attorney, Agent, or Firm*—Friedrich Kueffner

(57) ABSTRACT

A motor vehicle with a vehicle body, which comprises at least a pair of struts, at least one vibration-selective detection unit for detecting longitudinal stresses on the struts during operation of the vehicle, and at least one actuator for producing a force that counteracts the longitudinal stress, wherein the at least two struts are connected by a holding device, which is movably supported relative to the body, wherein a common actuator is configured for simultaneously adjusting the struts connected by the actuator.

10 Claims, 3 Drawing Sheets

MOTOR VEHICLE BODY OR SUPPORTING FRAME COMPRISING A VIBRATION DAMPING DEVICE

BACKGROUND OF THE INVENTION

1. Field of the Invention

The invention concerns a motor vehicle, especially a convertible with an automobile body, to which are assigned a pair of struts, at least one vibration-selective detection unit for detecting longitudinal stresses of the struts during operation of the vehicle, and at least one actuator for producing a force that counteracts a longitudinal stress.

2. Description of the Related Art

A general problem encountered with motor vehicles is that external excitation of vibrations during driving, say, by driving over uneven roadway features, for example, potholes or bumps, can cause undesired vibrations of the automobile body. Vibrations of this sort in the automobile body reduce driving safety and comfort. This problem is especially pronounced in convertibles with an integral body and frame, which, due to the nonrigid roof that cannot brace the body, especially when the roof is open, have a stability disadvantage compared to closed vehicle superstructures. However, this is basically a problem in all vehicles, including those that do not have an integral body and frame, say, frame vehicles, such as motorcycles or vehicles with an aluminum body, which are wholly or partially supported by a sectional frame.

It is well known that so-called vibration dampers, i.e., damping masses, can be provided to prevent the development of vibrations, which are suitable for damping vibrations of certain frequencies, to which the dampers are tuned. The tuning is possible only for a certain individual frequency. Moreover, adaptation to the given type of vehicle type is necessary, and the arrangement of the dampers in the hollow spaces of the car body is structurally difficult. The dampers themselves must have a high mass, which is at odds with the low vehicle weight and economical operation that are desired.

DE 198 20 617 C2 reveals the possibility of equipping individual, inherently length-variable struts of an integral body and frame or of a vehicle frame with a detection unit for detecting external longitudinal stresses on the given strut, an actuator for producing an active counterforce, and a control unit for the actuator. This makes it possible selectively to counteract the external excitation of vibration with short response times. However, this requires considerable structural expense, since the struts must be variable in length and equipped with the specified functional units.

SUMMARY OF THE INVENTION

The objective of the invention is to simplify the design of means for counteracting external excitation of vibration in a motor vehicle of the specified type.

The invention achieves this objective with a motor vehicle in which at least two struts are connected by a holding device, which is movably supported relative to the body and to which a common actuator is assigned for simultaneously influencing the struts connected by it.

The design in accordance with the invention makes it possible to achieve a reduction of vibrations in a motor vehicle body and/or supporting frame by simultaneous action on several struts, i.e., elongated structures of the body or frame, such that, due to the common holding device, it is not necessary to act on each strut individually. This reduces the structural expense.

If the holding device is rotatably supported on the body and includes at least one link, which can be rotated about an axis in its middle region and is connected at its end regions with symmetrically positioned struts, forces of exactly opposite phase can be introduced into the struts by a rotational motion of the holding device, by which, say, one of the struts can be compressed and the other can be extended. The strut which is compressed by external force, say, the force produced when one side of the vehicle rides over a pothole, experiences the extending force, i.e., the force that counteracts the external excitation.

If the struts are designed as bracing components separate from the body, the struts can be installed with the common holding device simply as a prefabricated module below the underbody of the vehicle. In addition, beyond the active vibration damping, the strut can thus also perform the function of a bracing component in a vehicle with, for example, an integral body and frame.

The struts can also be part of a supporting frame. In any case, the additional expense for the changeover of struts that are necessary anyway is minimized for their changeover in accordance with the invention.

A computer that can provide, by means of a learning program, an optimum reaction to the stress determined between the holding points of the strut can be used as the control unit for the actuator or actuators.

Further advantages and features of the invention are described below with reference to the specific embodiment of the object of the invention that is illustrated in the drawings.

DETAILED DESCRIPTION OF THE INVENTION

Figure 1:
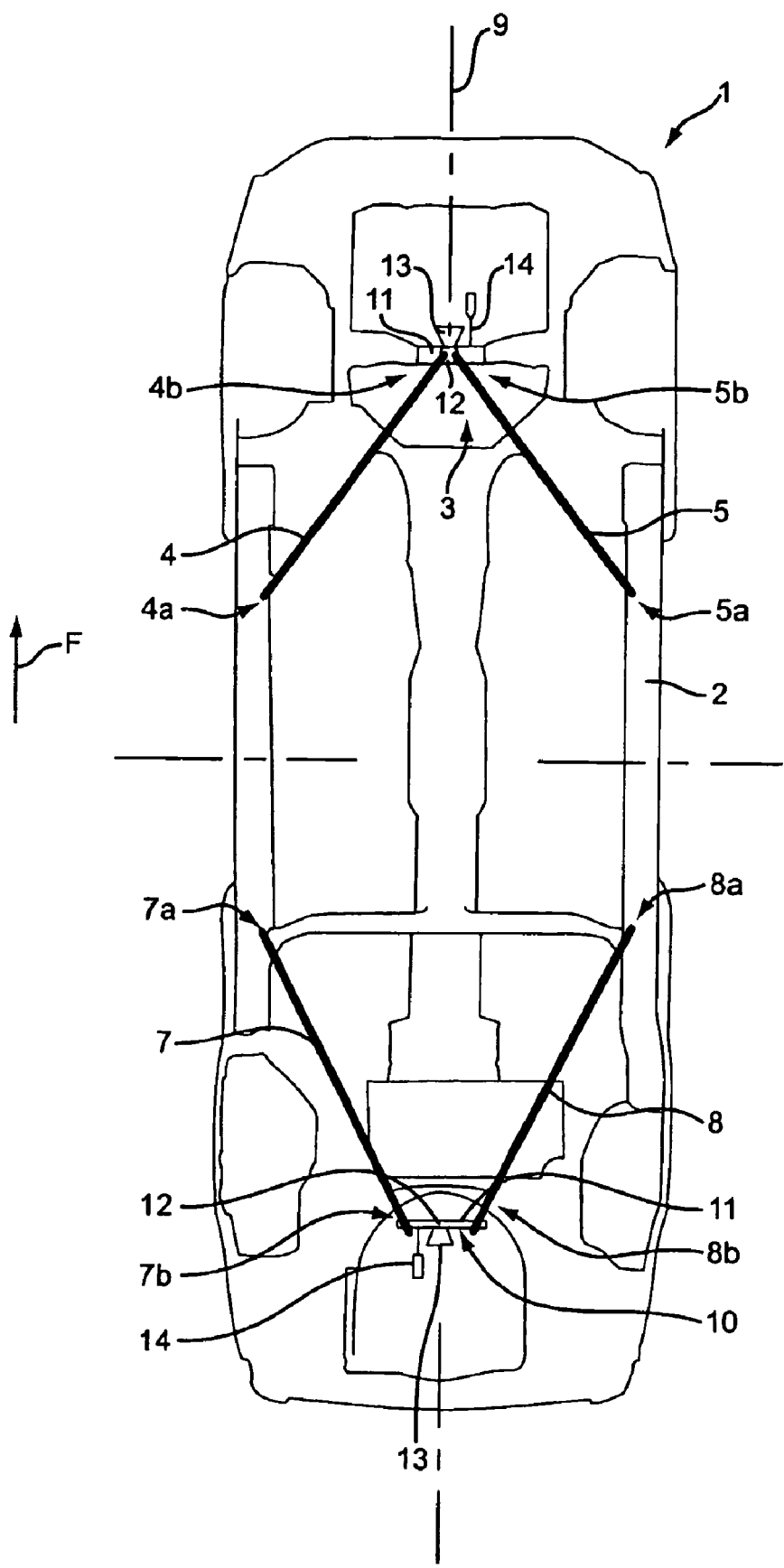
FIG. 1 shows a schematic view of the underbody of a motor vehicle from below with bracing struts that extend essentially diagonally.

According to the specific embodiment illustrated in FIG. 1, a front pair 3 of bracing struts 4, 5 and a rear pair 6 of bracing struts 7, 8 are assigned to the underbody 2 of a motor vehicle 1. This number and this arrangement of struts is not required and is shown only as an example.

The pairs 3, 6 are each arranged approximately symmetrically to a vertical longitudinal center plane 9. Their struts 4, 5 and 7, 8, respectively, extend from the outer peripheral areas of the underbody 2 to a point close to the vertical longitudinal center plane 9. They are each designed here as sections that are separate from the underbody, e.g., as tubular sections or box sections, which are made of metal or perhaps of a fiber-reinforced plastic. The form of the struts 4, 5, 7, 8 can differ considerably from the linear form shown here, e.g., angled components and/or components that are flat in some regions are also possible.

If bracing struts of the automobile body are present anyway, they have two functions when designed in accordance with the invention. On the one hand, they function as conventional bracing components. On the other hand, they have an adaptive vibration damping function. In other words, they act not only as passive bracing components but also as active elements that affect the vibrational behavior of the automobile body.

At their ends 4a, 5a, 7a, 8a that point outward in the transverse direction, the struts 4, 5, 7, 8 are connected with the underbody 2 or parts of the chassis. For this purpose, the ends can be formed as flattened flange regions, each of which has a hole through which fastening means can be passed. It is also possible to weld the struts 4, 5, 7, 8 to the automobile body or chassis or to attach them in some other way.

Figure 2:
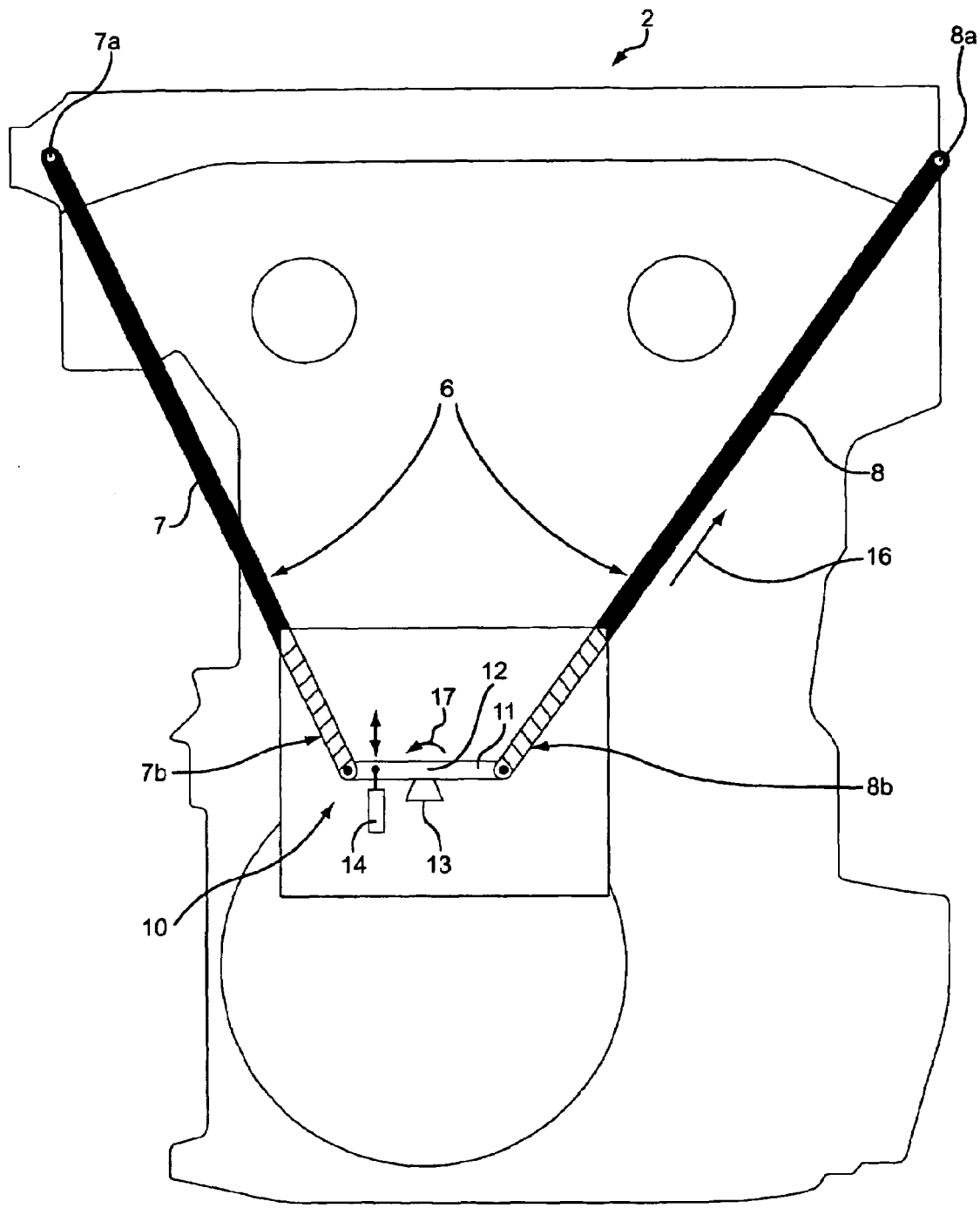
FIG. 2 shows a detail view of the rear area of an underbody with a strut design in accordance with the invention.

The end regions 4b, 5b, 7b, 8b of the struts at the opposite end from the body connection of the struts 4, 5 of the pair of struts 3 and the struts 7, 8 of the pair of struts 6 are held in a holding device 10. The holding device 10 itself is movably held on the body or the chassis and in the present case comprises a transverse link 11 that is designed as a balance arm and can rotate about an axis 12 that is at least almost vertical. The axis 12 is part of a bearing 13 that is a stationary part of the body and is mounted on the underbody 2 or on a crosspiece of the chassis (FIG. 2). The holding device 10 can also be connected with, for example, four or more struts, of which, for example, two lead to each side of the vehicle.

The rotational motion of the holding device 10 about the axis 12 can be influenced by an actuator 14, which can be connected here at one end with the underbody 2 and at the other end can be eccentrically connected with the balance arm 11 some distance from its axis 12. The ends 4b, 5b, 7b, 8b of the struts articulate at the outer ends of the balance arm 11. Alternatively, it would also be possible to assign exactly one of the struts 4, 5 or 7, 8 to each actuator and thus to move both struts 4, 5 and 7, 8 of the pair 3 or 6, respectively.

In addition, a detection unit (not shown) is assigned to the holding device 10 for detecting a deflection of the balance arm 11 from its normal position, which in the present case lies transversely to the direction of vehicle travel F. The detection unit is thus vibration-selective, since when an external vibration is excited, e.g., by riding over a pothole or a bump, torsion is produced in the body, and a tensile or compressive force is introduced into at least one of the struts 4, 5 and 7, 8 of a pair 3, 6 relative to the other through its end 4a, 5a, 7a, 8a secured on the automobile body. The opposite end 4b, 5b, 7b, 8b thus tries to take the balance arm 11 with it accordingly and to deflect it about its axis 12.

Figure 3:
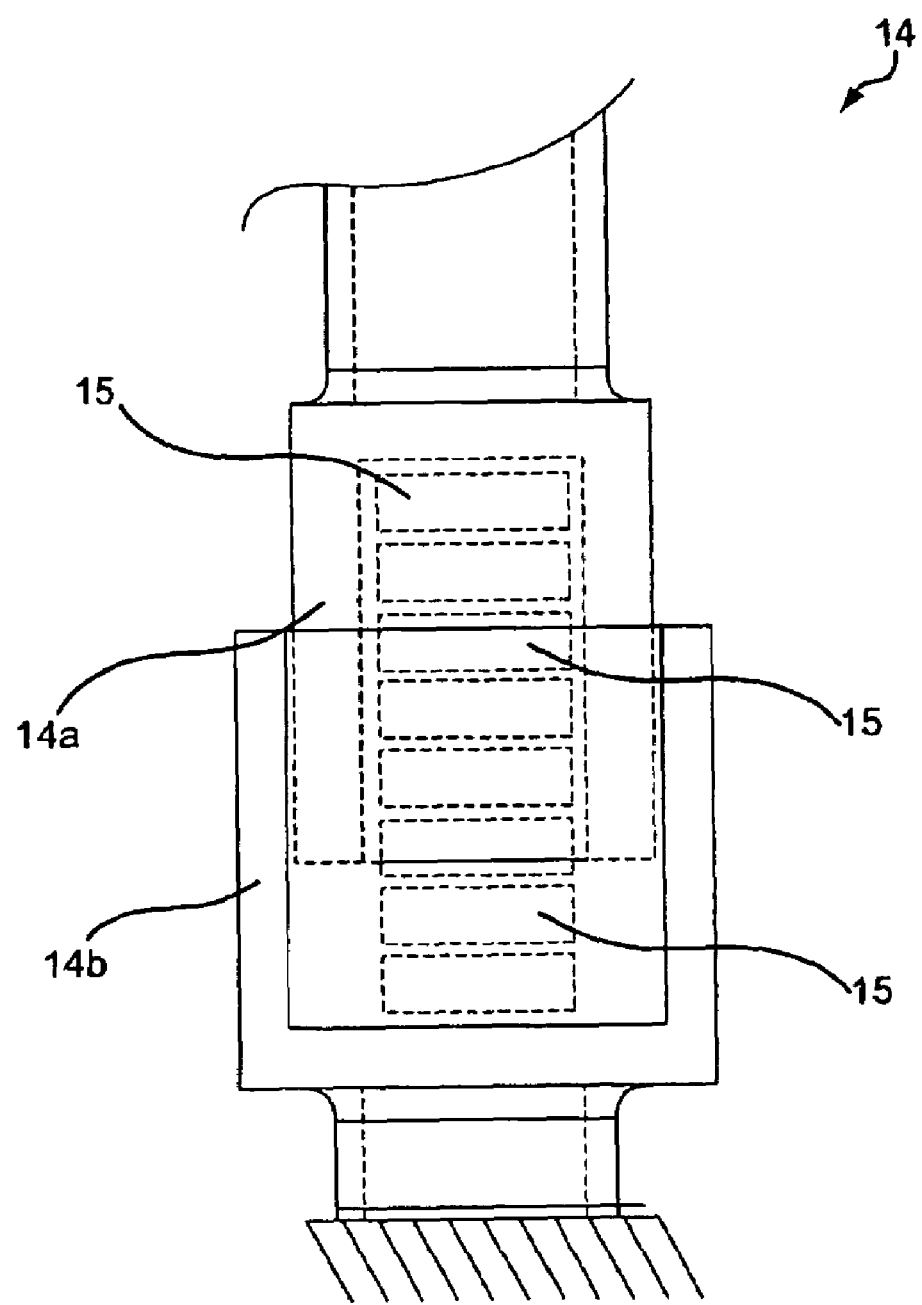
FIG. 3 shows a detail view of an actuator for affecting the rotation of the holding device.

This deflection tendency is detected by the one or more detection units, which contain, for example, a pressure-voltage converter, and is converted to an electric signal for the actuator 14. The actuator 14 comprises two parts 14a, 14b that can move relative to each other (FIG. 3). The part 14b is connected here with the body 2, and the part 14a is connected with the balance arm 11. If the actuator 14 is mounted in one of the struts 4, 5 and 7, 8 of each pair 3 and 6, respectively, both parts 14a, 14b would be part of this given strut. To allow relative motion of the parts 14a, 14b, voltage-pressure converters 15 can be provided, which, with suitable voltage activation by the detection unit, lengthen or shorten the actuator 14 and thus produce a rotational motion of the holding device 10 about the axis 12.

When, for example, one side of the vehicle passes over an unevenness in the roadway, a tensile force acts on the strut 8 in the direction of the arrow 16. This tensile force exerts a torque on the balance arm 11 about the axis 12 in the direction of the arrow 17. The torque is detected in the detection unit, which can be assigned especially to the balance arm 11 but also to the individual struts, whereupon the actuator 14 receives a control signal, which causes its extension and lengthening, so that it exerts a torque on the balance arm 11 in the direction opposite the arrow 17. The deflection of the balance arm 11 by the external excitation is thus counteracted, and the two struts 7, 8 of the pair 6 are acted upon with compression and tension in opposite phase from each other. This causes both struts 7, 8 to brace the body at the same time and to produce active damping. The effect of the external excitation is thus practically eliminated. The actuator 14 and the detection unit have very short response times, so that excitation frequencies of a few Hz to a few 10's of Hz can be effectively counteracted. In this regard, beyond their intrinsic material flexibility itself, the struts 4, 5, 7, 8 do not have to be length-variable. However, this is additionally possible.

In any case, only one actuator 14 is necessary for applying force to both struts 4, 5 and 7, 8 of a pair 3 or 6, and this keeps the structural expense and vehicle weight low. Ideally, it is also necessary to provide only one detection unit. It is also necessary to hold the balance arm 11 in only one place 13 on the body, and the balance arm 11 can be prefabricated with the struts 4, 5 and 7, 8, which further simplifies installation.

In another embodiment (not shown), the vehicle of the invention forms a tube frame, which serves as a supporting framework for the automobile body, which then does not have to be an integral body and frame. In this case, pairs of struts of this frame can likewise be designed in accordance with the invention, so that in this case the frame is not rigid but rather, as explained below, can actively respond to external excitation of vibrations. The invention can likewise be applied to a supporting frame, e.g., of a motorcycle.

The invention claimed is:

1. Motor vehicle (1) with a vehicle body, which comprises at least a pair (3; 6) of struts (4, 5; 7, 8), at least one vibration-selective detection unit for detecting longitudinal stresses on the struts (4, 5; 7, 8) during operation of the vehicle, and at least one actuator (14) for producing a force that counteracts the longitudinal stress, wherein the at least two struts (4, 5 and 7, 8) are connected by a holding device (10), which is movably supported relative to the body, wherein a common actuator (14) is configured for simultaneously adjusting the struts (4, 5 and 7, 8) connected by the actuator (14).

2. Motor vehicle in accordance with claim 1, wherein the holding device (10) is rotatably (12) supported on the automobile body.

3. Motor vehicle in accordance with claim 2, wherein the holding device (10) comprises at least one link (11), which rotates in a middle region thereof about an axis (12) that is at least almost vertical and which is connected at end regions thereof with the struts (4, 5; 7, 8).

4. Motor vehicle in accordance with claim 1, wherein the struts (4, 5; 7, 8) are components that are separate from the body and brace the body.

5. Motor vehicle in accordance with claim 1, wherein struts (4, 5; 7, 8) extend from outer peripheral areas of the body to a central region of an underbody (2).

6. Motor vehicle (1) with a supporting frame, which comprises at least one pair (3; 6) of struts (4, 5; 7, 8) and to which are assigned at least one vibration-selective detection unit for detecting longitudinal stresses of the struts (4, 5; 7, 8) during operation of the vehicle and at least one actuator (14) for producing a force that counteracts the longitudinal stress, wherein the at least two struts (4, 5; 7, 8) are connected by a holding device (10), which is movably supported relative to the supporting frame, wherein a common actuator (14) is configured for simultaneously adjusting the struts (4, 5; 7, 8) connected by the actuator (14).

7. Motor vehicle in accordance with claim 1, wherein a common vibration-selective detection unit is assigned to the holding device (10) for each pair (3; 6) of struts (4, 5; 7, 8).

8. Motor vehicle in accordance with claim 1, wherein the common actuator (14) is designed with several parts and has partial parts thereof (14*a*; 14*b*) that can move relative to each other.

9. Motor vehicle in accordance with claim 1, wherein the detection unit includes a tension/pressure converter.

10. Motor vehicle in accordance with claim 1, wherein the actuator (14) includes a pressure/tension converter (15).

* * * * *